(12) United States Patent
Kato et al.

(10) Patent No.: US 8,224,149 B2
(45) Date of Patent: Jul. 17, 2012

(54) RECORD/REPRODUCTION APPARATUS AND RECORD MODE SETTING METHOD FOR THE SAME

(75) Inventors: Toshihiro Kato, Tokyo (JP); Akinobu Watanabe, Yokohama (JP); Hiroyuki Marumori, Yokohama (JP); Takaki Matsushita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 996 days.

(21) Appl. No.: 12/078,449

(22) Filed: Mar. 31, 2008

(65) Prior Publication Data

US 2009/0041432 A1 Feb. 12, 2009

(30) Foreign Application Priority Data

Aug. 9, 2007 (JP) .................................. 2007-208600

(51) Int. Cl.
*H04N 5/765* (2006.01)
(52) U.S. Cl. ........ 386/200; 386/359; 386/230; 386/335; 386/284; 386/336
(58) Field of Classification Search .................. 386/83
See application file for complete search history.

(56) References Cited

U.S. PATENT DOCUMENTS

| 5,608,535 | A * | 3/1997 | Yoshida et al. ............... 386/200 |
| 2004/0246349 | A1 * | 12/2004 | Kim et al. .................. 348/231.99 |
| 2007/0292104 | A1 * | 12/2007 | Katano et al. .................... 386/52 |
| 2008/0008454 | A1 | 1/2008 | Umesako |
| 2008/0117302 | A1 * | 5/2008 | Min ........................ 348/207.99 |

FOREIGN PATENT DOCUMENTS

| EP | 1 484 916 A2 | 12/2004 |
| EP | 1 924 093 A1 | 5/2008 |
| JP | 2002-330401 | 11/2002 |
| JP | 2005-174522 | 6/2005 |
| JP | 2006-165925 | 6/2006 |
| JP | 2007-128599 | 5/2007 |
| WO | WO 2005/104543 | 11/2005 |

OTHER PUBLICATIONS

European Search Report issued in European Patent Application No. 08252600.5-1232, mailed Dec. 12, 2008.
Japanese Office Action, w/ English translation thereof, issued in Japanese Patent Application No. 2007-208600, dated Nov. 8, 2011.

* cited by examiner

*Primary Examiner* — Carl Colin
*Assistant Examiner* — S. Ali Zaidi
(74) *Attorney, Agent, or Firm* — McDermott Will & Emery LLP

(57) ABSTRACT

A record/reproduction apparatus capable of performing record-reproduction with high definition and standard definition appropriately records information, and includes: at least one of a display unit and an output unit to an external display device; a hard disk drive; and a disc drive corresponding to record-reproduction using a disc for record-reproduction in a high definition mode and a disc for record-reproduction in a standard definition mode. With the configuration, the record/reproduction apparatus performs a display on the display unit in the high definition mode or a display-output to the output unit in the high definition mode at activation, recognizes one of the hard disk drive and the disc drive as a record medium after the display-outputting, and sets a record mode to one of the hard disk drive and the disc drive based on a result of the recognition.

13 Claims, 3 Drawing Sheets

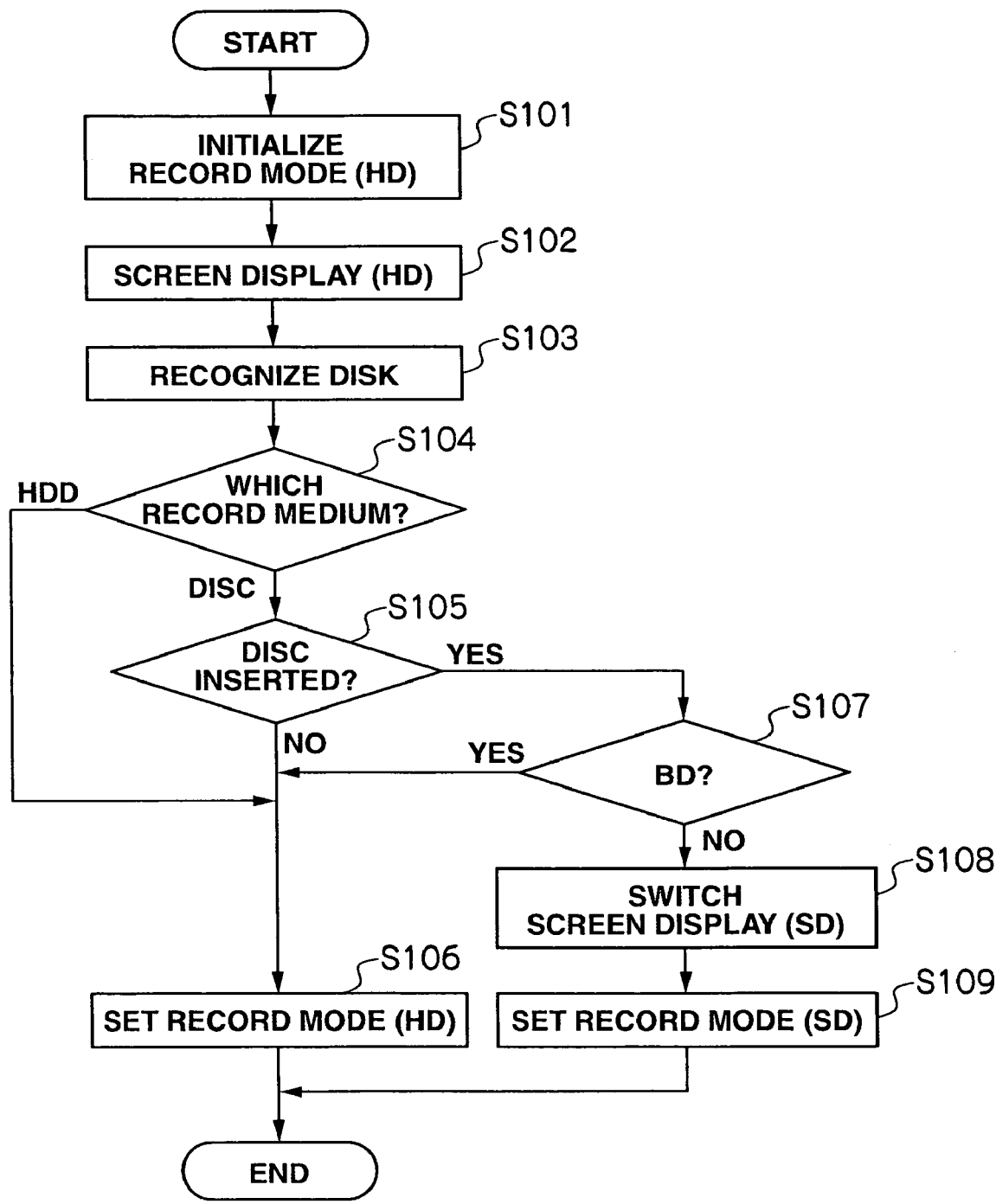

RECORD/REPRODUCTION APPARATUS AND RECORD MODE SETTING METHOD FOR THE SAME

CROSS-REFERENCES TO RELATED APPLICATIONS

This application relates to and claims priority from Japanese Patent Application No. 2007-208600, filed on Aug. 9, 2007, the entire disclosure of which is incorporated herein by reference.

BACKGROUND

1. Field of the Invention

The present invention relates to a record/reproduction apparatus and a record mode setting method for the record/reproduction apparatus, and more specifically to a record/reproduction apparatus and a record mode setting method for the record/reproduction apparatus for use in performing record-reproduction in a high definition mode (image quality of HD (high definition)) and a standard definition mode (image quality of SD (standard definition)).

2. Description of Related Art

A record/reproduction apparatus loaded with two drives, that is, a hard disk drive and a BD (blu-ray disc)/DVD (digital versatile disc) drive, has been proposed (refer to, for example, Japanese Patent Laid-Open No. 2007-128599). The record/reproduction apparatus can be a video camera etc. compatible with an HD mode.

In the video camera loaded with a conventional DVD drive, the default setting of the record mode of a DVD is an SD mode. However, the following problem occurs if the default of the record mode on the DVD/BD side is an SD mode in the video camera compatible with an HD mode.

The video camera is activated with the image quality of SD, and the output to a monitor and an external display screen is of the image quality of SD. When there is no disc inserted in the BD/DVD drive, the video camera is used with a hard disk drive as a record medium. Since high definition image quality is desirable in record-reproduction of data in the hard disk drive, the record mode of the hard disk drive may be set only in the HD mode. Therefore, the setting of the record mode of the video camera is switched from the SD mode to the HD mode. At this time, noise etc. occurs in the display on the monitor etc., and display disturbance arises. Since the output to a monitor etc. is performed before determining the presence/absence of a disc inserted in the BD/DVD drive, the influence of switching the setting of a record mode appears on the screen. In addition, the record medium when no disc is inserted in the BD/DVD drive may not be a hard disk drive, but a disc is desired to be inserted into the BD/DVD drive as the record medium. In this case, since the video camera is designed for the HD mode, it is desirable that the output to a monitor and an external display screen is of high definition, thereby switching from the SD mode to the HD mode, and the above-mentioned display disturbance occurs.

When a BD is inserted in the BD/DVD drive, the setting of the record mode is switched from the SD mode to the HD mode because it is desirable that data is record-reproduced with image quality of HD. At this time, as in the above-mentioned case, noise etc. occurs on the display of a monitor etc., thereby causing display disturbance.

On the other hand, when a record medium is switched from a hard disk drive to a BD/DVD drive and a record mode is initialized, the record mode is switched from the HD mode to the SD mode. This is because the available setting of the record mode of the hard disk drive is image quality of HD only, and the default setting of the record mode on the BD/DVD side is the SD mode since it is desirable that a hard disk drive is of high definition, as described above. At this time, as in the case above, noise etc. occurs on the display of a monitor etc., thereby causing display disturbance. In the case that a hard disk drive is designed to be compatible with the SD mode, the display disturbance also occurs as described above when the record mode is the HD mode. However, in the case that the record medium is switched from a BD/DVD drive to a hard disk drive, the display disturbance occurs as described above when the record mode is the SD mode without an inserted disc and the record mode of the hard disk drive is the HD mode.

The present invention has been developed to solve the above-mentioned problems, and proposes a record/reproduction apparatus and a record mode setting method for the record/reproduction apparatus capable of appropriately recording information.

SUMMARY

The present invention is a record/reproduction apparatus including: at least one of a display unit and an output unit to an external display device; a hard disk drive; a disc drive corresponding to record-reproduction using a disc for record-reproduction in a high definition mode and a disc for record-reproduction in a standard definition mode; a display-output unit for performing a display on the display unit in the high definition mode or for performing a display-output to the output unit in the high definition mode at activation; a recognition unit for recognizing one of the hard disk drive and the disc drive as a record medium after display-outputting by the display-output unit; and a record mode setting unit for setting a record mode to one of the hard disk drive and the disc drive based on a result of the recognition by the recognition unit.

The present invention can propose a record/reproduction apparatus and a record mode setting method for the record/reproduction apparatus capable of appropriately recording information.

Other aspects and advantages of the invention will be apparent from the following description and the appended claims.

BRIEF DESCRIPTION OF THE DRAWINGS

FIG. 3 is a flowchart showing the record mode setting process according to the present invention.

DETAILED DESCRIPTION OF PREFERRED EMBODIMENTS

An embodiment of the present invention is described below with reference to the attached drawings. In the following embodiments, the record/reproduction apparatus of the present invention is described as being applied to a video camera, but the present invention is not limited to a video camera.

Figure 1:
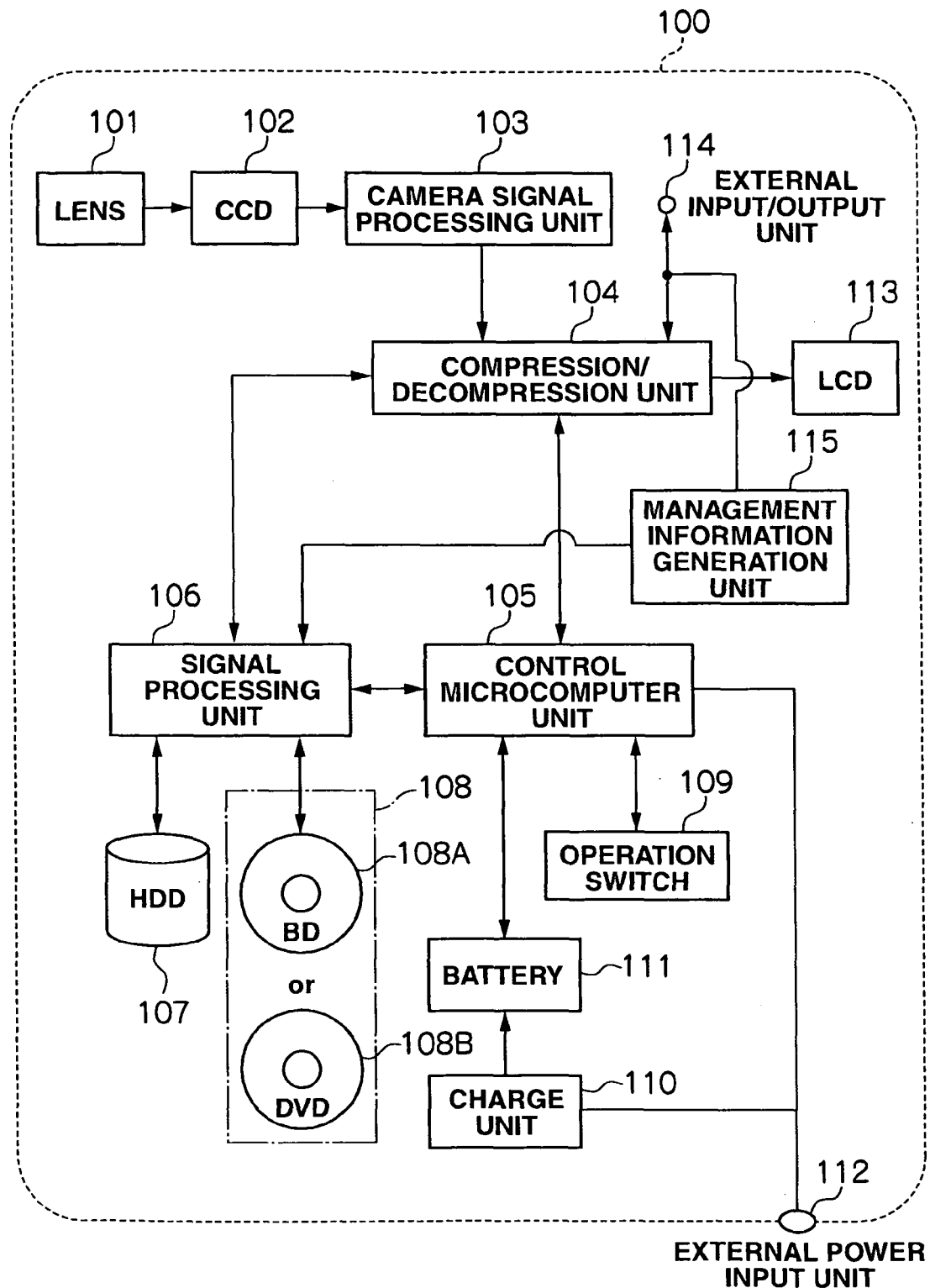
FIG. 1 is a block diagram showing the configuration of the record/reproduction apparatus according to the present invention.

FIG. 1 is a block diagram showing the configuration of a video camera 100.

The video camera 100 includes a lens 101, an image capture sensor (CCD) 102, a camera signal processing unit 103, a compression/decompression unit 104, a control microcomputer unit 105, a signal processing unit 106, a hard disk drive (HDD) 107, a BD/DVD drive 108, an operation switch 109, a charge unit 110, a battery 111, an external power input unit 112, a liquid crystal display (LCD) 113, an external input/output unit 114, and a management information generation unit 115. The BD/DVD drive 108 can perform record-reproduction with a BD 108A or a DVD 108B inserted.

In FIG. 1, each configuration is separately described for convenience of explanation, but they can be integrated appropriately into one chip depending on the circuit design etc. to provide for easy control and an advantage in terms of space for circuit design.

First described below is the operation of the video camera 100 shown in FIG. 1. The CCD 102 captures an image of an object through the lens 101, and the image captured by the CCD 102 is converted into an electric signal, and then converted into a video signal by the signal processing unit 103.

The video signal converted by the signal processing unit 103 is converted into a digital video signal by the compression/decompression unit 104 controlled by the control microcomputer unit 105. In addition, the compression/decompression unit 104 can convert an externally input video signal into a digital video signal by switching the input to the external input/output unit 114.

A signal converted into a digital video signal is recorded to an external record medium such as the BD 108A, the DVD 108B, or the HDD 107 by the signal processing unit 106. Thus, for example, data is recorded to a record medium such as a BD-R (blu-ray disc recordable) disc etc. formatted by the UDF (universal disk format) 2.6. When it is necessary to update the management information such as MD (meta data) information, MDM (meta data mirror) information, etc. depending on the postscript etc. to user data, the management information generation unit 115 generates management information, and the information is similarly recorded to a record medium.

Furthermore, the control microcomputer unit 105 is controlled by operating the operation switch 109, the signal processing unit 106 reads a video signal recorded on the BD 108A or the DVD 108B, and data is recorded on the HDD 107, thereby performing a dubbing process between media. Similarly, the video signal recorded on the HDD 107 can be read and recorded on the BD 108A or the DVD 108B.

The signal recorded on the record medium can be decompressed into a video signal by the compression/decompression unit 104, output to the external input/output unit 114, and displayed on the liquid crystal display (LCD) 113. The display unit is not limited to a liquid crystal display, but it can be, for example, an organic electroluminescence display.

Furthermore, the external power input unit 112 is used for external power supply from an AC power source etc. In addition, the battery 111 can be charged by the charge unit 110 by supplying power from the external power input unit 112. Thus, when the external power input unit 112 provides a power source, equipment can be operated by an external power supply. When an external power supply is not provided, each equipment unit in the video camera 100 can be operated by the power supply from the battery 111. It is not necessary to include all necessary functions for charging in the video camera 100, but there can be all or a part of the necessary functions for charging other than the external power input unit 112.

Figure 2:
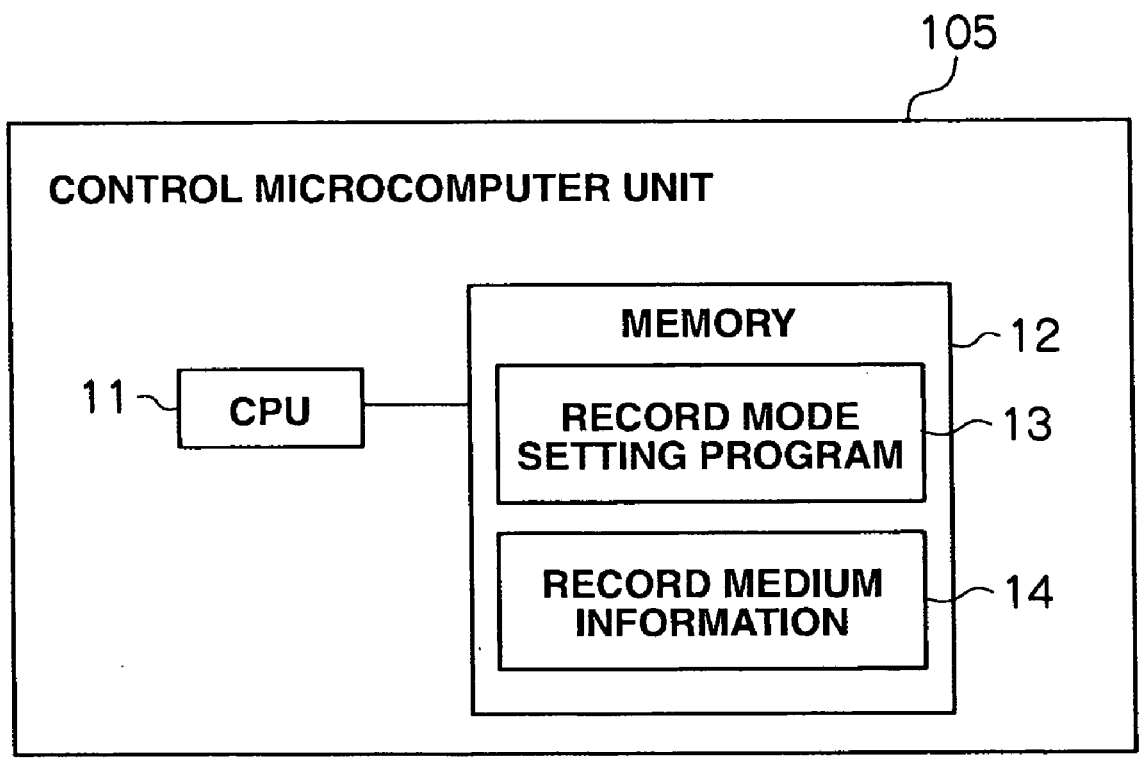
FIG. 2 shows a part of the configuration included in the control microcomputer unit.

FIG. 2 shows a part of the configuration included in the control microcomputer unit 105. As shown in FIG. 2, the control microcomputer unit 105 includes a CPU 11 and memory 12. The CPU 11 controls the entire video camera 100 by executing the program stored in the memory 12. The memory 12 stores various programs and data for operating the video camera 100. The memory 12 stores, for example, a record mode setting program 13 and record medium information 14.

The record mode setting program 13 is used to set a record mode at activation of the video camera 100. The record medium information 14 stores the information about whether the record medium is the HDD 107 or the BD/DVD drive. For example, if "1" is stored as the record medium information 14, it is determined that the record medium is the HDD 107. If "0" is stored, it is determined that the record medium is the BD/DVD drive 108.

Described below is the record mode setting process when the CPU 11 executes the record mode setting program 13. FIG. 3 is a flowchart showing the record mode setting process. The process is started when the operation switch 109 is operated and the power is turned on.

First, in step S101, a record mode is initialized, and the screen is output by setting the HD mode in step S102. Thus, an image captured by the lens 101 is display-output in the HD mode on the external display device (for example, a high definition television etc.) connected to the LCD 113 or the external input/output unit 114.

Then, in step S103, a disk as a target of the record medium is recognized. In step S104, the record medium is determined. That is, the record medium information 14 stored in the memory 12 is recognized, and it is determined whether the HDD 107 is set or the BD/DVD drive 108 is set as a record medium. In the above-mentioned example, if "1" is stored as the record medium information 14, it is determined that the record medium is the HDD 107. If "0" is stored, it is determined that the record medium is the BD/DVD drive 108. In step S103, if a long time is required for a disk recognizing process, an instruction to start the process is issued before the screen display step S102, and a disk can be determined after the screen display step S102.

When it is determined that the record medium is the BD/DVD drive 108 (disc in S104) it is determined in step S105 whether or not a disc has been inserted. If a disc has not been inserted (NO in S105), the HD mode is set as a record mode in step S106 because the video camera 100 is designed for the HD mode and is appropriate for use in the HD mode, and therefore it is desirable that the HD mode is set as the default for the BD 108A.

On the other hand, if it is determined that the record medium is the HDD 107 (HDD in S104), then the HD mode is set as a record mode in step S106 because the HDD 107 is set for the HD mode only.

If it is determined in step S105 that a disc has been inserted (YES in S105), then it is determined in step S107 whether or not the disc is the BD 108A. If it is determined that the inserted disc is the BD 108A (YES in S107), then control is passed to step S106, and the HD mode is set as a record mode because the BD 108A is designed for high definition, and therefore it is desirable that the HD mode is set as the default.

If it is determined in step S107 that the inserted disc is not the BD 108A (NO in S107), that is, if the DVD 108B is an inserted disc, then a screen display switching process is performed in step S108. That is, since the DVD 108B is used in the SD mode, the display-output is switched from the HD mode to the SD mode. Then, in step S109, the SD mode is set as a record mode.

Thus, if the HD mode is set in step S106, or the SD mode is set in step S109, the process of setting the record mode of the video camera 100 terminates.

According to the embodiment, when the video camera 100 is activated, after output is performed in the HD mode to the external display device connected to the LCD 113 and/or the external input/output unit 114 in the HD mode, if the record medium is the HDD 107 or if the record medium is the BD/DVD drive 108 and a disc has not been inserted or the inserted disc is the BD 108A, then the record mode can be set in the HD mode. Therefore, since the display-output is the HD mode and the record mode is the HD mode, it is not necessary to change the quality of the image output previously into the SD mode, thereby preventing noise etc. from occurring on the external display device connected to the LCD 113 and/or the external input/output unit 114, and preventing display disturbance on a monitor etc. Thus, when the video camera 100 is activated, a user can realize a smooth operation without visually recognizing display disturbance etc.

Furthermore, by performing the record mode setting process at the activation, the BD/DVD drive 108 can be set as a record medium for the video camera 100 for record-reproducing in the HD mode and the SD mode, and the HD mode is set as a record mode in any case other than when the DVD 108B is inserted. Therefore, the software resources used in the conventional DVD drive designed for activation in the SD mode can be continuously utilized.

According to the embodiment above, the present invention has been described as applied to the record/reproduction apparatus 100 including the LCD 113 and the external input/output unit 114 to an external display device, the HDD 107, and the BD/DVD drive 108 adapted for record-reproduction using the BD 108A and the DVD 108B, and having the functions of performing display-output to the LCD 113 in the HD mode or to the external input/output unit 114 in the HD mode at the activation (S102), then recognizing the HDD 107 or the BD/DVD drive 108 as a record medium to be used (S103), and setting a record mode to the HDD 107 or the BD/DVD drive 108 based on a result of the recognition (S106 and S109). However, the present invention is not limited to this application. For example, the LCD 113 or the external input/output unit 114 can be omitted in the video camera 100.

In the embodiment mentioned above, the memory 12 for recording the record medium information 14 indicating whether the record medium to be used is the HDD 107 or the BD/DVD drive 108, and a record medium is recognized according to the record medium information stored in the memory 12, but the method of determining a record medium is not limited to the application.

As described above, the present invention provides a record/reproduction apparatus and a record mode setting method for the record/reproduction apparatus capable of effectively utilizing the software resources having been used by a conventional DVD drive even for the record/reproduction apparatus for performing record-reproduction in the HD mode and the SD mode.

The present invention can be widely applied to a record/reproduction apparatus and a record mode setting method for the record/reproduction apparatus. The present invention can also be applied to disks that are recorded on a DVD in the HD mode by checking, after the disks are judged as ones recorded on a DVD, whether or not the disks are ones recorded in the HD mode.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A record/reproduction apparatus, comprising:
an output unit for an external display device;
a hard disk drive;
a disc drive for record-reproduction using a disc for record-reproduction in a high definition mode and a disc for record-reproduction in a standard definition mode;
a display-output unit for outputting a display to the output unit in the high definition mode prior to recognizing a record medium, wherein the display-output unit is set to the high definition mode at the time of activation of the record/reproduction apparatus before recognizing one of the hard disk drive and the disc drive as a record medium;
a recognition unit for recognizing one of the hard disk drive and the disc drive as a record medium after outputting a display by the display-output unit; and
a record mode setting unit for initializing a record mode of the hard disk drive and the disc drive to the high definition mode at the time of activation of the record/reproduction apparatus prior to recognizing the record medium,
wherein only when the recognition unit recognizes that the record medium is the disc drive and a disc determination unit determines that an inserted disc is a disc for record-reproduction in a standard definition mode, the record mode setting unit resets the initialized record mode to a standard definition mode and the display-output unit is switched from the high definition mode to the standard definition mode.

2. The record/reproduction apparatus according to claim 1, further comprising a record medium information record unit for recording record medium information indicating whether the record medium is the hard disk drive or the disc drive, wherein the recognition unit recognizes a record medium based on record medium information recorded on the record medium information record unit.

3. The record/reproduction apparatus according to claim 2, wherein when the recognition unit recognizes that the record medium is the hard disk drive, the record mode setting unit sets a high definition mode as the record mode.

4. The record/reproduction apparatus according to claim 1, further comprising
a disc presence/absence determination unit for determining whether or not the disc drive has a disc inserted therein, wherein when the recognition unit recognizes that the record medium is the disc drive, and when the disc presence/absence determination unit determines that no disc is inserted in the disc drive, the record mode setting unit sets a high definition mode as the record mode.

5. The record/reproduction apparatus according to claim 4, further comprising
a disc determination unit for determining whether the inserted disc is a disc for record-reproduction in the high definition mode or a disc for record-reproduction in the standard definition mode, wherein when the disc presence/absence determination unit determines that a disc is inserted, and when the disc determination unit determines that the disc is a disc for record-reproduction in the high definition mode, the record mode setting unit sets a high definition mode as the record mode.

6. The record/reproduction apparatus according to claim 5, wherein when the disc determination unit determines that the disc is a disc for record-reproduction in the standard definition mode, the record mode setting unit sets a standard definition mode as the record mode.

7. A record mode setting method for a record/reproduction apparatus having:
- at least one of a display unit and an output unit for an external display device;
- a hard disk drive; and
- a disc drive for record-reproduction using a disc for record-reproduction in a high definition mode and a disc for record-reproduction in a standard definition mode,
- the record mode setting method comprising:
- a step of outputting in the high definition mode a display on the display unit or outputting a display to the output unit in the high definition mode, prior to recognizing a record medium, at the time of activation of the record/reproduction apparatus;
- a step of recognizing one of the hard disk drive and the disc drive as the record medium after the step of outputting the display; and
- a step of setting a record mode to one of the hard disk drive and the disc drive based on a result obtained in the recognizing step.

8. The record mode setting method for the record/reproduction apparatus according to claim 7, wherein in the recognizing step, the record medium is recognized according to record medium information indicating whether the record medium is the hard disk drive or the disc drive.

9. The record mode setting method for the record/reproduction apparatus according to claim 8, wherein when the hard disk drive is recognized as the record medium in the recognizing step, a high definition mode is set as the record mode in the step of setting the record mode.

10. The record mode setting method for the record/reproduction apparatus according to claim 7, further comprising a step of determining whether or not a disc is inserted in the disc drive, wherein when the disc drive is recognized as a record medium in the recognizing step, and when it is determined in the determining step that no disc is inserted, a high definition mode is set as the record mode in the step of setting the record mode.

11. The record mode setting method for the record/reproduction apparatus according to claim 10, further comprising a step of determining whether the inserted disc is a disc for record-reproduction in the high definition mode or a disc for record-reproduction in the standard definition mode, wherein when it is determined that a disc is inserted in the determining step, and when it is determined in the disc determining step that the disc is a disc for record-reproduction in the high definition mode, a high definition mode is set as the record mode in the step of setting the record mode.

12. The record mode setting method for the record/reproduction apparatus according to claim 11, wherein when it is determined that the disc is a disc for record-reproduction in the standard definition mode in the disc determining step, a standard definition mode is set as the record mode in the step of setting the record mode.

13. A record/reproduction apparatus, comprising:
- a display unit;
- a hard disk drive;
- a disc drive for record-reproduction using a disc for record-reproduction in a high definition mode and a disc for record-reproduction in a standard definition mode;
- a display-output unit for outputting a display on the display unit in the high definition mode prior to recognizing a record medium, wherein the display-output unit is set to the high definition mode at the time of activation of the record/reproduction apparatus before recognizing one of the hard disk drive and the disc drive as a record medium;
- a recognition unit for recognizing one of the hard disk drive and the disc drive as a record medium after outputting a display by the display-output unit; and
- a record mode setting unit for initializing a record mode of the hard disk drive and the disc drive to the high definition mode before recognizing the record medium at the time of activation of the record/reproduction apparatus,
- wherein only when the recognition unit recognizes that the record medium is the disc drive and a disc determination unit determines that an inserted disc is a disc for record-reproduction in a standard definition mode, the record mode setting unit resets the initialized record mode to a standard definition mode and the display-output unit is switched from the high definition mode to the standard definition mode.

\* \* \* \* \*